July 25, 1967  C. O. DAVIDSON  3,332,537
CONVEYOR FOR FRAGILE ARTICLES
Filed July 23, 1965  2 Sheets-Sheet 1

INVENTOR.
CLARENCE O. DAVIDSON
BY
Townsend and Townsend
ATTORNEY

July 25, 1967   C. O. DAVIDSON   3,332,537
CONVEYOR FOR FRAGILE ARTICLES
Filed July 23, 1965   2 Sheets-Sheet 2
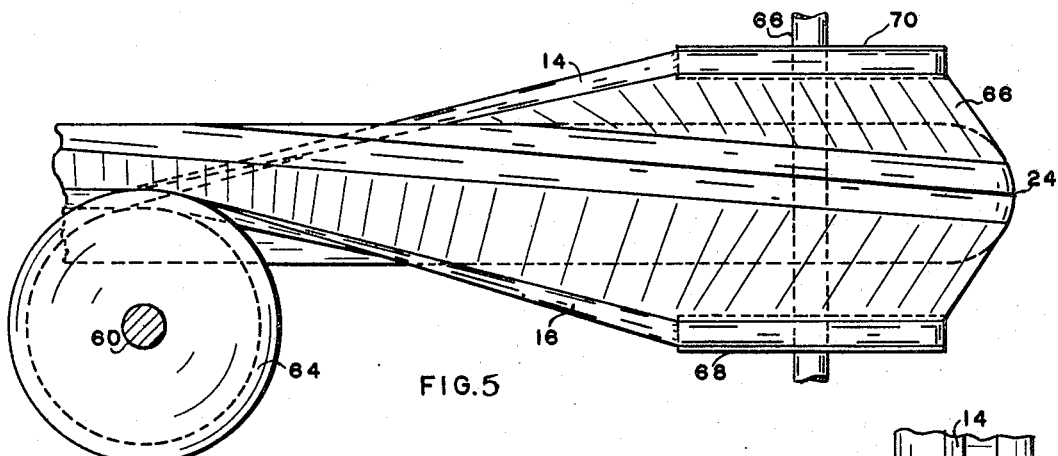
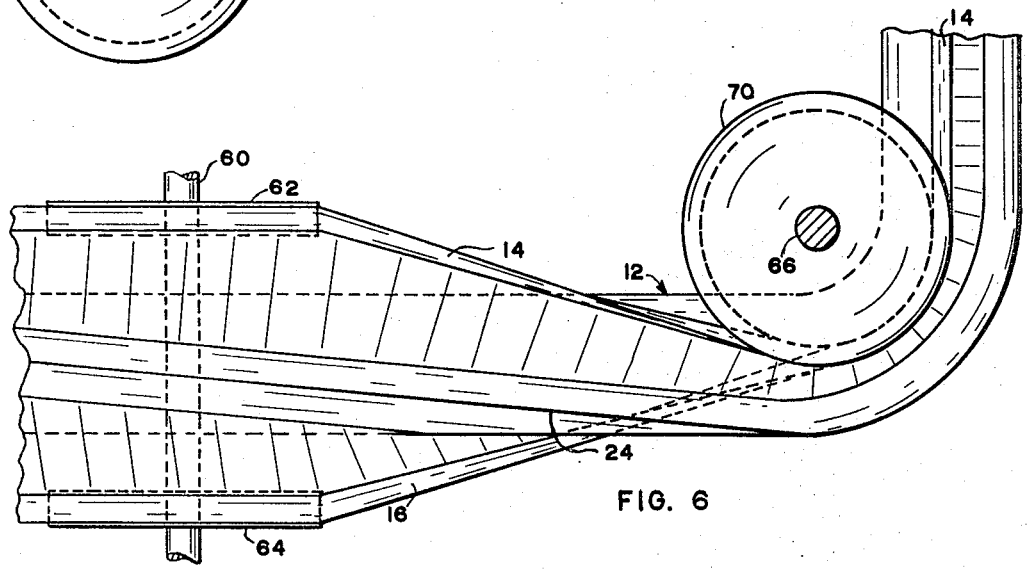
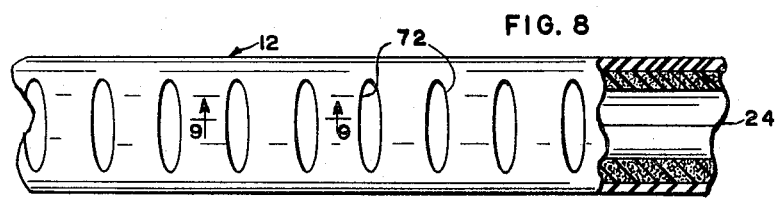
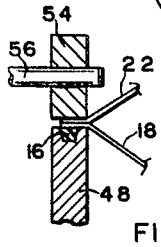
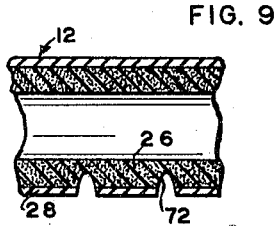
INVENTOR.
CLARENCE O. DAVIDSON
BY
Townsend and Townsend
ATTORNEY United States Patent Office 3,332,537
Patented July 25, 1967

3,332,537
CONVEYOR FOR FRAGILE ARTICLES
Clarence Orden Davidson, Rte. 1, Box 905,
Lakeport, Calif. 95453
Filed July 23, 1965, Ser. No. 474,376
7 Claims. (Cl. 198—201)

This invention relates to a conveyor for fragile articles wherein articles such as ripe fruit and like fragile articles are transported from one place to another without damage.

The specific embodiments of the present invention to be described in detail hereinafter include an endless tubular member formed of resilient material that tends to retain the member in its tubular shape. The tubular member preferably includes an inner yieldable surface so that fragile article contained therein are gently and firmly embraced by the material forming such surface. The tubular member is formed with a longitudinally extending slit that permits the tubular member to be spread so that fragile articles can be deposited into and removed from the interior thereof. The resiliency of the material however retains the slit in a substantially closed position when no external forces are present. The tube is supported between a pair of laterally spaced endless drive members such as V-belts in such a way that lateral movement of the V-belts from one another opens the slit, whereas movement of the V-belts toward one another permits the resilience of the tubular material to close the slit thereby firmly embrachming the articles in the tube. Opposed pulleys or sheaves are provided at strategic locations for moving the endless drive members laterally toward and away from one another as convenience may require.

An object of the present invention is to provide apparatus for conveying fragile articles without subjecting them to undue pressure or abrasive forces. This object is accomplished by providing a resilient tubular member that firmly embraces and supports the fragile article. Because all driving forces are carried by endless drive members, such as V-belts or the like, the resilient tubular member need only be strong enough to support the weight of the fragile article. Because of this, only minimal compressive forces are imposed on the fragile article.

A further object of the present invention is to provide a conveyor for fragile articles that can convey the articles along vertically or horizontally extending paths. Achievement of this object follows from the fact that the resilient tubular member serves only to retain the fragile article whereas V-belts, or like endless drive members, provide the necessary motive force. Because both the V-belts and tubular member are flexible they can be carried around sheaves without materially affecting the position of the fragile articles within the tubular member.

A further object is to provide a fragile article conveyor of uncomplex and inexpensive construction. Attainment of this object is made possible because standard V-belts and driving pulleys constitute the sole driving force as a consequence of which a relatively lightweight tubular member can be used for retaining the fragile articles. The use of conventional V-belts for driving members permits utilization of well-understood techniques for changing the direction of conveyor movement in different horizontal and/or vertical directions.

These and other objects will be more apparent after referring to the following specification and accompanying drawings in which:

FIG. 5 is an elevation view of a conveyor of the present invention showing an arrangement for turning the direction of conveyor movement at a 90° angle;

FIG. 6 is a plan view of FIG. 5;

FIG. 7 is a partial cross-sectional view taken on line 7—7 of FIG. 1;

FIG. 8 is a detail view of the tubular conveyor member showing a modification of the same; and FIG. 9 is a cross-sectional view taken on line 9—9 of FIG. 8.

Figures 3, 4:
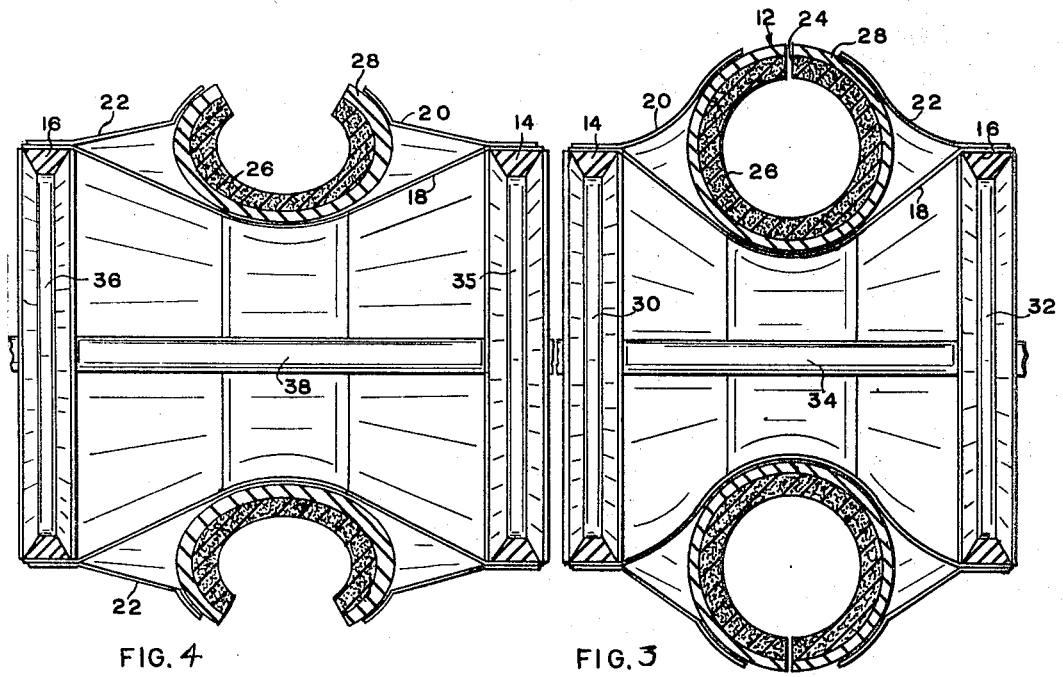
FIG. 3 is a cross-sectional view at enlarged scale taken along line 3—3 of FIG. 1.
FIG. 4 is a cross-sectional view at enlarged scale taken along line 4—4 of FIG. 1.

Referring more particularly to the drawing and specifically to FIG. 3, reference numeral 12 indicates a portion of an endless tubular member supported between laterally spaced V-belts 14 and 16 by a first flexible member 18 that spans the V-belts, and second and third flexible members 20 and 22 that are secured to the outer or upper portion of the tubular member on opposite sides of a longitudinal slit 24 formed continuously in the tubular member. In one conveyor designed according to the present invention, flexible members 18, 20, 22 are constructed of canvas adhesively joined to belts 14 and 16 and tubular member 12. The tubular member is here shown by way of example as including an inner layer 26 of soft spongelike material (for example, polyurethane foam) and an outer stiffer layer 28 formed for example of rubber or lightweight spring steel. The outer layer serves to retain the tubular member in a generally circular cross section when in a relaxed or unstressed condition. In transporting lightweight articles it has been found that inner layer 26 affords sufficient resiliency to retain the tubular member 12 in a circular configuration without necessity for outer layer 28.

The inner diameter of tubular member 12 and the thickness of material 26 are established in respect to the diameter of the article to be transported so that when the tubular member is in its relaxed or unstressed condition the article will be embraced by and nested in the interior of the tubular member. In the simplified form of the invention shown in FIG. 1, the tubular member resides in a relaxed article engaging condition at the right side of the figure and is permitted to assume such condition by the relative close lateral spacing of paired sheaves 30 and 32. Sheaves 30 and 32 preferably have a radius in excess of the diameter of tubular member 12 so that the relative position of the lips forming slit 24 does not change as the conveyor moves around the sheaves. The sheaves are carried on a shaft 34 which can be driven by a suitable power source not shown. It will be seen that an article in tubular member 12 will be there retained as belts 14 and 16 traverse sheaves 30 and 32.

In order to open the slit 24 V-belts 14 and 16 are passed over sheaves 35 and 36 which are mounted on a shaft 38. Sheaves 35 and 36 are laterally spaced from one another sufficient to tension flexible members 20 and 22 to separate the lips defining slit 24. Consequently on the top reach of the conveyor adjacent sheaves 35 and 36, an article can be deposited into tubular member 12 through slit 24, and at the bottom reach of the conveyor adjacent sheaves 35 and 36, refuse or like unwanted materials will fall from the conveyor by gravity because the slit is open.

Figure 1:
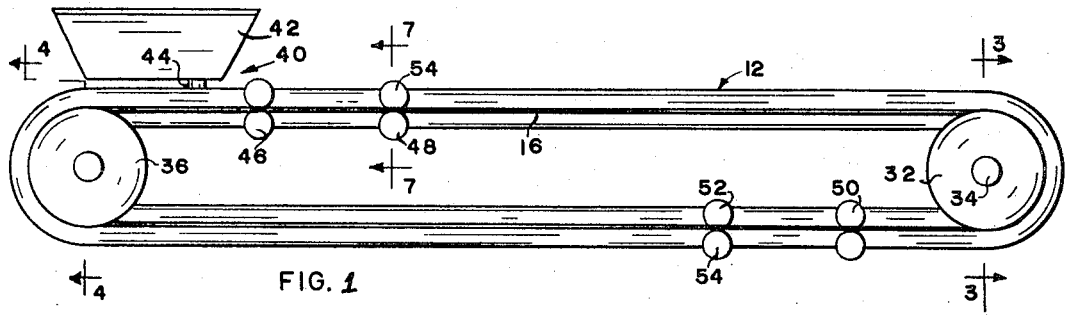
FIG. 1 is a diagrammatic side elevation view of a conveyor exemplifying the present invention.
Figure 2:
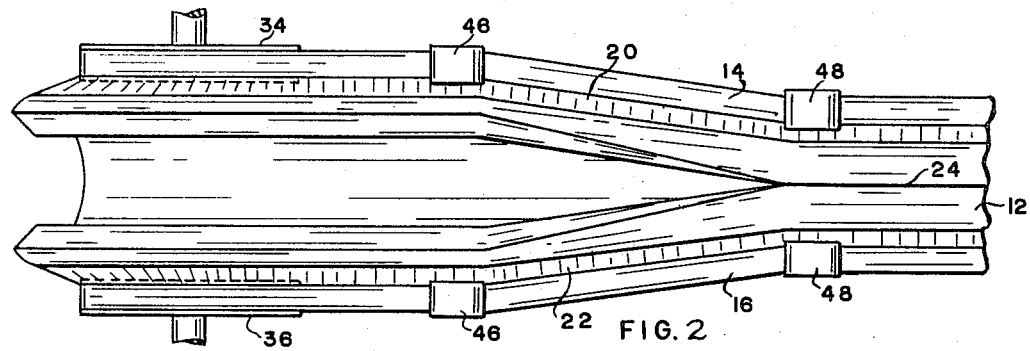
FIG. 2 is a top plan view at enlarged scale showing certain details of a portion of the conveyor of FIG. 1.

The conveyor system depicted in FIG. 1 includes a loading station 40 having a hopper 42 in which the articles to be conveyed are placed and an outlet chute 44 through which the articles are serially fed to the conveyor. Along the path of travel of the conveyor is a pair of idler sheaves 46 that are laterally spaced apart by an amount substantially equal to the lateral spacing between sheaves 35 and 36 to retain slit 24 in an open condition and admit fragile articles into the interior of tube 12. Spaced further along the path of conveyor travel are a second pair of idler pulleys 48 which are spaced laterally by an amount equal to the lateral spacing between sheaves 30 and 32 so that on passing pulleys 48, slit 24 will be closed and the article will be firmly embraced in tubular member 12. Accordingly, in the traverse of the conveyor between pulleys 48 and sheaves 30 and 32, the article to be conveyed will be firmly embraced within tubular member 12. On the return or lower reach of the conveying apparatus of FIG. 1 is a pair of idler pulleys 50 that are spaced laterally from one another the same distance as the lateral distance between sheaves 30 and 32. Spaced along the path of travel from idler pulleys 50 is a second pair of idler pulleys 52 that are spaced from one another by an amount equal to the spacing between sheaves 35 and 36. As a consequence articles retained within tubular member 12 will be discharged at or just before arrival opposite idler pulleys 52. The tubular member proceeds with slit 24 in a semi-open condition between pulleys 52 and sheaves 35, 36 because the span is so long therebetween that the resilience of the tubular member partially closes the slit. During such traverse of the conveyor, that is between pulleys 52 and sheaves 35, 36, the semi-open condition of slit 24 permits any refuse and like unwanted material to drop from the tubular member.

Opposite each of the idler pulleys is a roller 54 for retaining the V-belts in contact with the pulleys. In FIG. 7 an exemplary roller 54 is shown carried on a shaft 56 so that the V-belt 16 is securely urged into the groove of the pulley 48. Consequently, the lateral forces of flexible members 18 and 22 will not dislodge the V-belts from a straight line path of movement.

Referring now to FIGS. 5 and 6, a horizontal shaft 60 carries idler pulleys 62 and 64 which support V-belts 14 and 16. A vertically extending shaft 66 is mounted along the path of travel of the conveyor and carries idler pulleys 68 and 70. V-belt 14 extends from idler pulley 62 to idler pulley 70 and is rotated through 90° in the span between the pulleys. Criteria used in establishing the specific length between shafts 60 and 66 to permit sufficient belt length for the 90° twist are within the purview of well-known art. In a similar way V-belt 16 extends from idler pulleys 64 around idler pulley 68. As a consequence, at the output side of idler pulleys 68 and 70, slit 24 lies at the side of tubular member 12 rather than at the top. However, the spacing of pulleys 68 and 70 is such that flexible members 18, 20 and 22 are not tensioned to open the slit. Thus it will be seen that the present invention affords a conveyor that can change direction in horizontal, vertical or oblique plane without dislodgement of the articles retained therein.

Referring to FIGS. 8 and 9, there is shown a portion of the tubular member having exterior, transversely extending cut-out portions 72 therein opposite the slit 24. Cut-out portions 72 permit the tubular member 12 to be carried around smaller pulleys without causing distortion of the tubular member and inadvertent dislodgement of articles carried therein. It will be noted that the cut-out portions do not entirely pierce inner layer 26 so that the articles within the tubular member will be firmly retained therein even for relatively sharp bends around small diameter pulleys or sheaves.

Thus it will be seen that I have provided a conveyor for fragile articles that is simple and straightforward and therefore inexpensive to produce. Moreover, the conveyor is capable of firmly engaging the fragile articles through all direction and/or paths of movement. When discharge is desired, the V-belts or like drive members carrying the tubular member need only be spread apart to tension flexible member 18, 20, 22 and to open slit 24, thereby permitting egress of the articles carried within the tubular member.

While several embodiments of my invention have been shown and described, it will be obvious that other adaptations and modifications can be made without departing from the true spirit and scope of the invention.

What is claimed is:

1. A conveyor for fragile articles comprising an endless tubular member including a resilient surface defining portion interiorly thereof, said tubular member being formed with a slit longitudinally thereof and being sufficiently resilient to define a generally circular cross section when in a relaxed condition so as to maintain said slit closed, first and second endless conveyor belts, a flexible member extending between said belts and traversing said tubular member opposite said slit, means flexibly joining opposite lateral sides of said tubular member adjacent said slit to respective said belts, a plurality of pairs of laterally spaced apart sheaves for supporting respective said belts, at least a first pair of said sheaves being spaced apart by a distance sufficient to spread said tubular member apart to permit deposit of articles interiorly thereof, and at least a second pair of said sheaves being spaced apart so as to permit the resilience of the tubular member to close said tubular member to retain said articles therein.

2. A conveyor according to claim 1 in combination with a third pair of sheaves spaced from said second pair of sheaves, means for supporting said third pair of sheaves for rotation about an axis substantially perpendicular to the axis of rotation of said second pair of sheaves to change direction of conveyor movement.

3. Apparatus for conveying fragile articles comprising an endless tubular member having a portion defining a resilient surface interiorly thereof, said tubular member being slit along the periphery thereof to form two confronting lip portions, said tubular member including resilient means for maintaining said lip portions in substantially contacting relationship when said tubular member is in a relaxed condition, first and second endless belts of a length substantially equal to said tubular member, a first flexible member extending between said belts and traversing said tubular member opposite said slit, second and third flexible members each having an inner edge secured to said tubular member adjacent one of said lips and an outer edge secured to a respective said conveyor belt, a plurality of pairs of spaced apart sheaves for supporting said conveyor belts, at least a first pair of said sheaves being spaced apart by a distance sufficient to spread said tubular member apart to permit deposit of articles interiorly thereof, and at least a second pair of said sheaves being spaced apart so as to close said tubular member to retain said articles therein.

4. Conveying apparatus comprising a pair of endless drive belts, means for supporting said belts in laterally spaced apart relation along a path having an upper reach and a lower reach, a first flexible member spanning and affixed to said belts, an elongate hollow tubular member supported on said first flexible member along the upper reach, said tubular member having a longitudinal slit therein opposite the site of support by said first flexible member, said tubular member including a wall portion of resilient material for biasing said slit to a closed position, a second and third flexible member each extending from one said drive belt to said tubular member on opposite sides of said slit, said belt supporting means including a first pair of sheaves in the upper reach laterally spaced apart by an amount sufficient to tension said second and third flexible members to open said slit for permitting deposit of an article into said tubular member, a second pair of sheaves on said upper reach spaced sufficiently close to permit said second and third flexible members to slacken transversely for effecting closure of said slit, and a third pair of sheaves in the lower reach and being laterally spaced apart by an amount sufficient to tension said second and third flexible members for opening said slit to discharge articles from said tubular member.

5. A conveyor having an upper and lower reach and comprising an endless article supporting member formed by a wall defining a hollow tubular casing, said wall having a longitudinal slit therealong, said wall being sufficiently resilient to bias said slit to a substantially closed condition when said tube is unstressed for retaining articles therein, first and second endless drive members, means for supporting said drive members in spaced apart relation along the upper and lower reaches, a flexible member spanning said drive members for supporting said tubular casing at a site opposite said slit, a first flexible member extending from said first belt to said casing and being secured to said wall adjacent one side of said slit, a second flexible member extending from said second belt to said casing and being secured to said wall adjacent the other side of said slit, said drive member supporting means including a first pair of sheaves spaced apart to laterally tension said first and second flexible members for opening said slit, and second pair of sheaves in the upper reach spaced along the path of travel from said first pair and laterally spaced from one another suffiicently close to permit closing of said slit, and a third pair of sheaves in said lower reach spaced along the path of travel to tension said first and second flexible members for opening said slit to discharge articles in said casing.

6. A fragile article conveyor comprising first and second V-belts, an endless longitudinally slitted flexible tubular member that is resilient to urge the member in a tubular article engaging condition, a first flexible member extending from said first belt to said tubular member adjacent one side of said slit, a second flexible member extending from said second belt to said tubular member adjacent the opposite side of said slit, a third flexible member spanning said belts and supporting said tubular member at a site opposite said slit, first and second main sheaves for supporting said V-belts along an upper forward reach and a lower return reach, said sheaves each having a diameter at least about twice the diameter of said tubular member, said first pair of sheaves being laterally spaced apart to tension said first and second flexible members to open said slit, means for serially depositing articles into said tubular member in the upper conveyor reach adjacent said first pair of sheaves, a first pair of pulleys spaced intermediate said article depositing means and said second pair of sheaves for supporting said belts, said second pair of pulleys and second pair of sheaves being laterally spaced to move said belts toward one another to close said slit, and a second pair of pulleys for supporting said belts on the lower conveyor reach, said second pair of pulleys being laterally spaced apart to open said slit and discharge articles from said tubular member.

7. A conveyor according to claim 6 including a roller associated with each said pulley, and means for mounting each said roller adjacent the pulley with which it is associated to retain said V-belts in engagement with the associated pulley.

References Cited

UNITED STATES PATENTS

| | | | |
|---|---|---|---|
| 2,199,935 | 5/1940 | Johns | 198—201 X |
| 3,164,238 | 1/1965 | McCullagh | 198—201 X |

FOREIGN PATENTS

| | | |
|---|---|---|
| 80,035 | 3/1895 | Germany. |
| 86,236 | 9/1957 | Netherlands. |

EVON C. BLUNK, *Primary Examiner.*

A. C. HODGSON, *Assistant Examiner.*